United States Patent
Brita et al.

(10) Patent No.: US 9,593,178 B2
(45) Date of Patent: *Mar. 14, 2017

(54) PRE-POLYMERIZED CATALYST COMPONENTS FOR THE POLYMERIZATION OF OLEFINS

(71) Applicant: Basell Poliolefine Italia S.r.l., Milan (IT)

(72) Inventors: Diego Brita, Ferrara (IT); Gianni Collina, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 80 days.

This patent is subject to a terminal disclaimer.

(21) Appl. No.: 14/365,357

(22) PCT Filed: Dec. 11, 2012

(86) PCT No.: PCT/EP2012/075005
§ 371 (c)(1),
(2) Date: Jun. 13, 2014

(87) PCT Pub. No.: WO2013/092281
PCT Pub. Date: Jun. 27, 2013

(65) Prior Publication Data
US 2014/0316083 A1    Oct. 23, 2014

Related U.S. Application Data

(60) Provisional application No. 61/580,091, filed on Dec. 23, 2011.

(30) Foreign Application Priority Data

Dec. 23, 2011    (EP) ..................... 11195476

(51) Int. Cl.
*C08F 10/02*    (2006.01)
*C08F 10/00*    (2006.01)

(52) U.S. Cl.
CPC .............. *C08F 10/02* (2013.01); *C08F 10/00* (2013.01)

(58) Field of Classification Search
CPC ....................................................... C08F 10/02
See application file for complete search history.

(56) References Cited

U.S. PATENT DOCUMENTS

| 5,153,158 A | * | 10/1992 | Kioka ..................... C08F 10/00 502/108 |
| 6,627,710 B1 | * | 9/2003 | Sacchetti ................ C08F 10/00 502/103 |
| 2011/0092656 A1 | | 4/2011 | Fushimi et al. | |

FOREIGN PATENT DOCUMENTS

| CN | 102066430 A | 5/2011 |
| EP | 0435332 A2 | 7/1991 |
| WO | WO2010/034664 A1 | 4/2010 |

OTHER PUBLICATIONS

PCT International Search Report & Written Opinion mailed Apr. 3, 2013, for PCT/EP2012/075005.

* cited by examiner

*Primary Examiner* — Catherine S Branch

(57) ABSTRACT

A pre-polymerized catalyst component for the polymerization of olefins endowed with high activity and morphological stability comprises a non-stereospecific solid catalyst component containing Ti, Mg and a halogen, and an amount of an ethylene/alpha-olefin block (co)polymer ranging from 0.1 up to 5 g per g of said solid catalyst component, said prepolymerized catalyst component being characterized by a mercury porosity, due to pores having radius up to 1 μm, ranging from 0.15 to 0.5 cm$^3$/g and by the fact that at least 55% of said porosity is due to pores having pore radius up to 0.2 μm.

5 Claims, No Drawings

PRE-POLYMERIZED CATALYST COMPONENTS FOR THE POLYMERIZATION OF OLEFINS

This application is the U.S. National Phase of PCT International Application PCT/EP2012/075005, filed Dec. 11, 2012, claiming benefit of priority to European Patent Application No. 11195476.4, filed Dec. 23, 2011, and benefit of priority under 35 U.S.C. §119(e) of U.S. Provisional Application No. 61/580,091 filed Dec. 23, 2011, the contents of which are incorporated herein by reference in their entirety.

FIELD OF THE INVENTION

The present invention relates to catalyst components for the preparation of ethylene (co)polymers by using gas-phase, slurry or bulk (co)polymerization processes.

BACKGROUND OF THE INVENTION

High-yield catalyst components for the polymerization of olefins and in particular for ethylene are known in the art. They are generally obtained by supporting, on a magnesium dihalide, a titanium compound normally chosen from titanium halides, alkoxide and haloalcoholates. Said catalyst components are then used together with an aluminum alkyl compound in the polymerization of ethylene. This kind of catalyst components, together with the catalysts obtained therefrom, are largely used in the plants for the (co)polymerization of ethylene both operating in liquid phase (slurry or bulk) and in gas-phase. However, the use of the catalyst components as such is not completely satisfactory. Indeed, due to the high reactivity of the ethylene, the kinetic of the polymerization reaction is very high. As a consequence, the catalyst is subject to a very strong tension during the initial stage of polymerization which can cause the uncontrolled breakage of the catalyst itself. This event is the cause of the formation of fine particles of polymer, which, in turn, leads to low bulk density of the polymer and to operating process difficulties.

In the attempt to solve these problems, the catalyst is pre-polymerized under controlled conditions, so as to obtain pre-polymerized catalysts purposed to retain better morphology. In fact, it is believed that after the pre-polymerization, the catalysts increase their resistance in such a way that the tendency to break under polymerization conditions is decreased. As a consequence, the formation of fine particles would be reduced and the overall bulk density improved. Typically, the catalysts are prepolymerized with one olefin which is often the same olefin which is then polymerized in the main polymerization step. Accordingly, the non-stereospecific catalysts used for ethylene polymerization are often pre-polymerized with ethylene. The pre-polymerization with ethylene of a non-stereospecific catalyst to be used in ethylene polymerization however, does not fully solve the problem. In fact, the morphological properties and resistance of the catalyst are improved, if any, only in combination with an unacceptable decrease of the catalyst polymerization activity. This is confirmed for example by U.S. Pat. No. 4,325,837 which discloses in table 14A and 14B, the use of a non-stereospecific catalyst pre-polymerized with ethylene to an extent of lower than 50% b.w., based on the weight of the total pre-polymerized catalyst. The activity and the morphological properties of the polymer produced with the pre-polymerized catalyst are in certain cases lower than that of the non-pre-polymerized one. In the same patent it is said (column 37 lines 57-60) that the use of a pre-polymerized catalyst is of no advantage with respect to the non pre-polymerized one.

WO01/85803 describes that by the pre-polymerization of a non stereospecific catalyst with prochiral monomers it would be possible to obtain a catalyst for the polymerization of olefins capable to produce polymers with high bulk density and that has an activity which is higher than that of the original non pre-polymerized catalyst. However, the described pre-polymerized catalyst, although of interest under certain polymerization conditions, does not show an acceptable morphological stability under polymerization carried out under drastic conditions such as those carried out in the presence of high amount of hydrogen in order to prepare ethylene polymers with low molecular weight. Moreover, it has been noticed that the propylene pre-polymerized catalyst tends to form a too high amount of aggregates of particles that have to be removed in order to have a homogeneous lot with a consequent loss of material.

It has also been discussed in the prior art the option to use more than one monomer in the prepolymerization stage. The preferred option is that of using mixtures of different monomers polymerized simultaneously thereby producing random pre-polymers. EP-A-435332 is an example of such teaching describing the preparation of a prepolymer obtained by polymerizing small amounts of ethylene and propylene. The prepolymer/catalyst system is then used in the preparation of propylene heterophasic copolymers.

Sequential pre-polymerization of different monomers is also taught although limited to certain specific types of monomers. EP-A-604401 discloses the preparation of a pre-polymerized catalyst obtained by contacting, under polymerization conditions, a catalyst system with (1) a linear olefin and (2) a non-linear olefin in order to form a linear olefin/non linear olefin block copolymer as a prepolymerized solid product. This prepolymerized catalyst, after having been subject to a titanation treatment, is then used in the polymerization of propylene. Ethylene and propylene are listed among linear olefins, while saturated ring containing hydrocarbon monomers, branched olefins and aromatic monomers are included in the definition of non-linear olefins. Comparative examples carried out without pre-polymerization stage show that the specific prepolymerization treatment has no effect on catalyst activity or morphological stability while the major impact is on mechanical properties of the final polymer product.

SUMMARY OF THE INVENTION

The applicant has now found that by subjecting a solid catalyst component to a specific sequential prepolymerization treatment with certain monomers it is possible to obtain a catalyst prepolymerized with a block copolymer endowed with a peculiar porosity feature. Such catalysts, when used in the polymerization of ethylene are capable to generate in high yields polymers with regular morphology even under drastic polymerization conditions.

It is therefore herein disclosed a pre-polymerized catalyst component for the polymerization of olefins $CH_2=CHR$, wherein R is hydrogen or a C1-C12 hydrocarbon group, characterized by comprising a non-stereospecific solid catalyst component, comprising Ti, Mg and a halogen and an amount of an ethylene/alpha-olefin block (co)polymer ranging from 0.1 up to 5 g per g of said solid catalyst component, said prepolymerized catalyst component being characterized by a mercury porosity due to pores up to 1 μm ranging from 0.15 to 0.5 cm³/g and by the fact that at least 55% of said porosity is due to pores having pore radius up to 0.2 μm.

DETAILED DESCRIPTION OF THE INVENTION

Throughout the present application the term "non-stereospecific solid catalyst component" means a solid catalyst component that gives, under the standard polymerization conditions described in the experimental section, a propylene homopolymer having an insolubility in xylene at 25° C. lower than 80% and preferably lower than 75%.

Throughout the present application the term ethylene/alpha olefin block copolymer means a copolymer mainly constituted by sequences or fractions of ethylene polymerized molecules and sequences or fractions of alpha olefin polymerized molecules; i.e, the block copolymer is mainly constituted by a mixture of ethylene homopolymers distinct chains and alpha olefin homopolymer distinct chains or mixtures of chains having distinct long portions (blocks) of ethylene polymerized sequences and propylene polymerized sequences. Such block copolymers are typically obtained by sequential polymerization in which the polymerization does not substantially take place with the simultaneous presence of two monomers. In other words, the successive monomer is polymerized only when the previous one has disappeared either because completely polymerized or because it has been removed.

Preferably, the alpha-olefin is selected from those of $CH_2=CHR^1$, wherein $R^1$ is a C1-C6 linear alkyl group. Preferably, the alpha-olefin is selected from propylene, butene-1, hexene-1 and octene-1. Most preferably, the alpha olefin is propylene.

Preferably, the amount of ethylene/alpha-olefin block (co)polymer is less than 3 g, more preferably less than 2 g and especially less than 1 g per g of solid catalyst component. In a particularly preferred embodiment, said amount is from 0.1 to 0.9 g per g of solid catalyst component.

Preferably, in the ethylene/alpha-olefin block (co)polymer the amount of ethylene polymerized fraction ranges from 10 to 90%, more preferably from 15 to 85 and especially from 30 to 80% of the total amount of ethylene/alpha-olefin prepolymer.

In this connection, it has surprisingly been observed a synergic effect on the bulk density of the ethylene polymers obtained by polymerizing ethylene in the presence of the pre-polymerized catalyst of the invention. In particular, the bulk density of ethylene polymers obtained by slurry polymerization of ethylene with prepolymerized catalysts containing ethylene/alpha-olefin, in particular propylene, pre-polymers, is higher than the value expected on the basis of the linear combination of the bulk density values obtained by polymerizing ethylene with, respectively, ethylene homopolymers prepolymerized catalyst and propylene homopolymers prepolymerized catalyst.

Preferably, the prepolymerized catalyst component has a mercury porosity due to pores up to 1 μm ranging from 0.15 to 0.4 cm³/g.

Preferably, at least 60% and more preferably at least 65% of the mercury porosity is due to pores having pore radius up to 0.2 μm.

Preferably the non-stereospecific solid catalyst component comprises a titanium compound and a magnesium dihalide. The magnesium halides, preferably $MgCl_2$, in active form used as a support for Ziegler-Natta catalysts, are widely known from the patent literature. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is broadened to form a halo.

The preferred titanium compounds used in the non-stereospecific solid catalyst component of the present invention are those of formula $Ti(OR^{II})_{n-y}X_y$, where $R^{II}$ is a C1-C20 hydrocarbon group X is halogen, n is the valence of titanium and y is a number between 1 and n. Particularly preferred compounds are $TiCl_4$, $TiCl_3$ and Ti-tetraalcoholates or Ti-chloroalcoholates of formula $Ti(OR^{III})_aCl_{n-a}$ where n is the valence of titanium, a is a number comprised between 1 and n, and $R^{III}$ is a C1-C8 alkyl or aryl group. Preferably $R^{III}$ is selected from ethyl, propyl, n-butyl, isobutyl, 2-ethylhexyl, n-octyl and phenyl.

The titanium compound can be pre-formed, or it is produced in-situ by the reaction of a titanium tetrahalide, in particular $TiCl_4$, with alcohols $R^{II}OH$ or with titanium alkoxides having the formula $Ti(OR^{II})_4$ where $R^{II}$ has the meaning defined above.

Preferably, more than 50%, more preferably more than 70% and especially more than 90% of the titanium atoms are in the 4+ valence state.

The non-stereospecific solid catalyst components may comprise an electron donor compound (internal donor), selected among ethers, esters, amines and ketones. However, as already explained, the solid catalyst component must be non stereospecific according to the definition already given and determined according to the test reported in the characterization section. Therefore, if present, the electron donor compound should either not have stereoregulating ability or be present in such an amount that it does not provide sufficient stereoregulating ability to the catalyst. As a general indication, the electron donors not having stereoregulating ability may be present in a wide range of amounts but preferably to an extent such that their molar ratio to Ti is lower than 10, preferably lower than 7 and more preferably lower than 5. Preferably, donors having stereoregulating ability or belonging to formula (I) below, are present in amount such as to give ED/Ti ratios lower than 0.5, preferably lower than 0.3 and more preferably lower than 0.1.

Preferred electron donor compounds are selected from esters of aliphatic or aromatic carboxylic acids such as phthalates, acetates, benzoates, alkoxybenzenes described in WO2011/015553, cyclic alkyl ethers such as tetrahydrofurane and electron donor compound of formula (I) below $$RR_1C(OR_4)—CR_2R_3(OR_5) \tag{I}$$

in which R, $R_1$, $R_2$ and $R_3$ are, independently, hydrogen or $C_1$-$C_{20}$ hydrocarbon groups which can also be condensed to form a cycle, $R_4$ and $R_5$ are C1-C20 alkyl groups, or $R_6CO—$ groups where $R_6$ is a $C_1$-$C_{20}$ alkyl or aryl group, or they can be joined with R and $R_3$ respectively to form a cycle; said R to $R_6$ groups possibly containing heteroatoms selected from O, Si, halogens, S, N and P.

Preferably, when R and $R_4$ form a cycle, $R_5$ is C1-C20 alkyl group. Preferably, in the electron donor compound of formula (I), R, $R_4$ and $R_5$ are methyl.

Preferably, in the electron donor compound of formula (I) $R_1$ to $R_3$ are hydrogen. When $R_4$ and $R_5$ are linear, branched or cyclic alkyl groups they are preferably chosen among C1-C5 alkyl groups and more preferably among methyl or ethyl. Preferably they are both methyl. Among $R_6CO$ groups preferred is acetyl and benzyl.

Specific electron donor compounds of formula (I) are ethylene glycol diacetate, 1,2-dimethoxypropane, 1,2-diethoxypropane, 1,2-diethoxyethane, methyl tetrahydrofurfuryl ether, 1,2-dimethoxypropane being the most preferred.

As mentioned above such donors either do not have stereoregulatung ability or are used in such an amount that they do not provide sufficient stereoregulating ability.

In addition to the above mentioned characteristics, the non-stereospecific solid catalyst component (a) may show a porosity $P_F$ determined with the mercury method ranging from 0.2 to 0.80 cm$^3$/g and more preferably from 0.3 to 0.70 cm$^3$/g usually in the range 0.35-0.60 cm$^3$/g.

The surface area measured by the BET method is preferably lower than 80 and in particular comprised between 10 and 70 m$^2$/g. The porosity measured by the BET method is generally comprised between 0.10 and 0.50, preferably from 0.10 to 0.40 cm$^3$/g.

The mercury porosity due to pores up to 1 μm of the pre-polymerized catalyst component is lower than that of its corresponding non-stereospecific solid catalyst component precursor, i.e., in its not pre-polymerized form. Preferably, the porosity of the prepolymerized catalyst component is less than 70%, more preferably less than 65% and especially ranging from 62 to 35% of the mercury porosity value of the corresponding non-stereospecific solid catalyst component precursor in non prepolymerized form.

The particles of solid component have substantially spherical morphology and average diameter comprised between 5 and 150 μm, preferably from 20 to 100 μm and more preferably from 30 to 80 μm. As particles having substantially spherical morphology, those are meant wherein the ratio between the greater axis and the smaller axis is equal to or lower than 1.5 and preferably lower than 1.3.

A method suitable for the preparation of spherical components mentioned above comprises a step (a) in which a compound $MgCl_2 \cdot mR^{III}OH$, wherein $0.3 \leq m \leq 1.7$ and $R^{III}$ is an alkyl, cycloalkyl or aryl radical having 1-12 carbon atoms is reacted with the said titanium compound of the formula $Ti(OR^I)_nX_{4-n}$, in which n, y, X and $R^I$ have the same meaning as already defined.

In this case $MgCl_2 \cdot mR^{III}OH$ represents a precursor of Mg dihalide. These kind of compounds can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it is convenient to first prepare adducts with more than 1.7 moles of alcohol per mole of $MgCl_2$ and then subjecting them to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

Generally these dealcoholated adducts are also characterized by a porosity (measured by mercury method) due to pores with radius due to pores with radius up to 0.1 μm ranging from 0.15 to 2.5 cm$^3$/g preferably from 0.25 to 1.5 cm$^3$/g.

In the reaction of step (a) the molar ratio Ti/Mg is stoichiometric or higher; preferably this ratio is higher than 3. Still more preferably a large excess of titanium compound is used. Preferred titanium compounds are titanium tetrahalides, in particular $TiCl_4$. The reaction with the Ti compound can be carried out by suspending the adduct in cold $TiCl_4$ (generally 0° C.); the mixture is heated up to 80-140° C. and kept at this temperature for 0.5-8 preferably from 0.5 to 3 hours. The excess of titanium compound can be separated at high temperatures by filtration or sedimentation and siphoning. The step (a) can be repeated twice or more. In cases of catalysts containing an electron donor compound, this latter is preferably added together with the titanium compound in the reaction system for reaction with the $MgCl_2 \cdot mR^{III}OH$ adduct. However, it can also be first contacted with the adduct alone and then the so formed product reacted with the titanium compound. As an alternative method, the electron donor compound can be added separately in a further step after the completion of the reaction between the adduct and the titanium compound.

The final pre-polymerized catalyst component can be obtained by pre-polymerizing the non-stereospecific solid catalyst component with the ethylene and the alpha-olefin.

In particular, the block prepolymer of the present invention can be obtained by a specific prepolymerization sequence comprising first the pre-polymerization of ethylene and after its completion, the prepolymerization of the alpha olefin. The prepolymerization of first ethylene and then propylene is the most preferred. The pre-polymerization is normally carried out in the presence of an Al-alkyl compound.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. Use of tri-n-octylaluminum is particularly preferred. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

It has been found particularly advantageous to carry out said pre-polymerization using low amounts of alkyl-Al compound. In particular, said amount could be such as to have an Al/Ti molar ratio from 0.01 to 50, preferably from 0.01 to 10 and more preferably from 0.05 to 3.

The pre-polymerization can be carried out in liquid phase, (slurry or solution) or in gas-phase at temperatures ranging from 20 to 100° C., preferably ranging from 30 and 90° C. and more preferably ranging from 30 and 70° C. Furthermore, it is preferably carried out in a liquid diluent in particular selected from liquid hydrocarbons. Among them, pentane, hexane and heptane are preferred.

As explained, the so obtained pre-polymerized catalyst components can be used in the (co)polymerization of ethylene, allowing to obtain, with high yields, polymers with regular morphology particularly expressed in terms of high bulk density. The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase. The gas-phase process can be carried out in a fluidized or stirred, fixed bed reactor or in a gas-phase reactor comprising two interconnected polymerization zones one of which, working under fast fluidization conditions and the other in which the polymer flows under the action of gravity. Also, combination of both type of gas-phase reactors can be used.

In particular, the catalysts of the invention are endowed with features that render them particularly suitable for the liquid (bulk or slurry) and gas-phase polymerization processes. They can be used in polymerization plant set-up including or not a pre-polymerization section. In fact, since the catalysts have no aging problems they can be also pre-polymerized in a batch scale and then used in liquid or gas-phase olefin polymerization plants operating without a pre-polymerization line.

In particular, said ethylene (co)polymerization processes can be carried out in the presence of a catalyst comprising (A) the pre-polymerized catalyst component above described and (B) an Al-alkyl compound of the type described above. In the main polymerization process the amount of Al is higher than that used in the prepoly. Preferably, the Al compound is used in an amount such that the Al/Ti ratio is higher than 1 and is generally comprised between 10 and 800.

The above described polymerization process can be carried out under the polymerization conditions generally known in the art. Accordingly, the polymerization is generally carried out at temperature of from 20 to 120° C., preferably of from 40 to 80° C.

In any of the polymerization processes used (liquid or gas-phase polymerization) the catalyst forming components (A) and (B) can be pre-contacted before adding them to the polymerization reactor. Said pre-contacting step can be carried out in the absence of polymerizable olefin or optionally in the presence of said olefin in an amount up to 3 g per g of solid catalyst component. The catalyst forming components can be contacted with a liquid inert hydrocarbon solvent such as propane, n-hexane, or n-heptane at a temperature below about 60° C. and preferably from about 0° C. to 30° C. for a time period of from 10 seconds to 60 minutes.

The above process is suitable for the preparation of wide range of polyethylene products. As an example, the following products can be prepared: high density ethylene polymers (HDPE, having a density higher than 0.940 g/cm$^3$), comprising ethylene homopolymers and copolymers of ethylene with α-olefins having 3-12 carbon atoms; linear low density polyethylenes (LLDPE, having a density lower than 0.940 g/cm$^3$) and very low density and ultra low density (VLDPE and ULDPE, having a density lower than 0.920 g/cm$^3$, to 0.880 g/cm$^3$) consisting of copolymers of ethylene with one or more α-olefins having from 3 to 12 carbon atoms, having a mole content of units derived from the ethylene higher than 80%;

The following examples are given in order better illustrate the invention without limiting it

EXAMPLES

Characterization

The properties are determined according to the following methods:
MIE flow index: ASTM-D 1238 condition E
Porosity with Mercury: the measurement is carried out using a Pascal 140-240 series porosimeter by Carlo Erba.

The porosity is determined by intrusion of mercury under pressure. For this determination a calibrated dilatometer (capillary diameter 3 mm) CD$_3$P (by Carlo Erba) is used, that is connected to a reservoir of mercury and to a high-vacuum pump. A weighed amount of sample is placed in the dilatometer. The apparatus is then placed under high vacuum and is maintained in these conditions for ca. 20 minutes. The dilatometer is then connected to the mercury reservoir and the mercury is allowed to slowly fill the dilatometer, until it reaches the level marked on the dilatometer at a height of 10 cm. The valve that connects the dilatometer to the vacuum pump is closed and then the mercury pressure is gradually increased with nitrogen up to 100 kPa. Subsequently, the calibrated dilatometer is transferred into an autoclave with oil for high pressure in order to reach pressure values up to 200 MPa. Under the effect of the pressure, the mercury enters into the pores of the particles and the mercury level decreases accordingly.

The porosity (cm$^3$/g), the pore distribution curve and the average pore size are directly calculated from the integral pore distribution curve, which is a function of both the volume reduction of the mercury and the applied pressure values. All these data are provided and elaborated by the porosimeter associated computer which is equipped with dedicated software supplied by Carlo Erba. After calculation, the average pores radius is given as weighted average of the single average pores radius contribution for each interval of porosity.

General Procedure for the Standard Propylene Polymerization Test

A 4 liter steel autoclave equipped with a stirrer, pressure gauge, thermometer, catalyst feeding system, monomer feeding lines and thermostating jacket, was used. The reactor was charged with 0.01 g of solid catalyst component and with 6.6 mmoles of TEAL. Moreover, 1.6 kg of propylene, and 1.5 NL of hydrogen were added. The system was heated to 70° C. over 10 min. under stirring, and maintained under these conditions for 120 min. At the end of the polymerization, the polymer was recovered by removing any non-reacted monomers and was dried under vacuum.

General Slurry Procedure for Ethylene Polymerization (HDPE)

Into a 4 liters stainless steel autoclave, degassed under N$_2$ stream at 70° C., 1600 cc of anhydrous hexane, 0.04 g of spherical component and 0.87 g of triisobutylaluminum (Tiba) were introduced. The whole was stirred, heated to 75° C. and thereafter 4 bar of H$_2$ and 7 bar of ethylene were fed. The polymerization lasted 2 hours during which ethylene was fed to keep the pressure constant.

General Procedure for Gas-Phase Ethylene Polymerization (HDPE)

A 15.0 liter stainless-steel fluidized reactor equipped with gas-circulation system, cyclone separator, thermal exchanger, temperature and pressure indicator, feeding line for ethylene, propane, hydrogen, and with a 1 L steel reactor for the catalyst pre-polymerization and/or injection of the catalytic system into the fluidized bed reactor.

The gas-phase apparatus was purified by fluxing pure nitrogen at 40° C. for 12 hours and then was circulated a propane (10 bar, partial pressure) mixture containing 0.2 g of TIBA at 80° C. for 30 minutes. It was then depressurized and the reactor washed with pure propane, heated to 80° C. and finally loaded with propane (60 mol %), ethylene (10 mol %) and hydrogen (30 mol %) having 24 bar of total pressure.

In a 100 mL three neck glass flask were introduced in the following order, 20 mL of anhydrous hexane, 0.7 g of TIBA, and 0.25 g of the catalyst component. They were mixed together and stirred at room temperature for 5 minutes and then introduced in the 1-L reactor with 100 g of propane.

Here It was kept at 40° C. per 2 hours before the introduction of the catalytic system into the fluidized bed reactor where the polymerization starts. The polymerization test lasts 2 hours.

Comparative Example 1

Preparation of the Solid Component

Preparation of the Spherical Support (Adduct of $MgCl_2$/EtOH)

A magnesium chloride and alcohol adduct was prepared following the method described in Example 2 of WO98/44009. The adduct containing about 3 mols of alcohol and had an average size of about 40 μm. The adduct was subject to a thermal treatment, under nitrogen stream, over a temperature range of 50-150° C. until a weight content of about 41% of alcohol was reached.

Into a 2 l glass reactor provided with stirrer, were introduced 1 L of TiCl4, 50 g of the support prepared as described above and, at temperature of 0° C., 4.0 g of 1,2-dimethoxy-propane (1,2DMP) (Mg/DMP=8.0 mol/mol). The whole mixture was heated and kept under stirring for 120 minutes at 100° C. After that, stirring was discontinued and the liquid siphoned off. Two washings with fresh hexane (1 liter) were performed at 50° C. and then, other two more hexane washings were performed at room temperature. The spherical solid component was discharged and dried under vacuum at about 50° C.

The composition of the solid was the following:

| | |
|---|---|
| Total titanium | 4.2% (by weight) |
| Mg | 18.0% (by weight) |
| 1,2-DMP | 3.8% (by weight) |

Its porosity due to pores having radius until 1 μm was 0.49 $cm^3/g$. 84% of this porosity being due to pores having radius equal to, or lower than, 0.2 μm.

When subject to the propylene polymerization standard procedure produced a propylene polymer having 68% of insolubility in xylene at 25° C.

Propylene-Ethylene Sequential Pre-Polymerization

Into a 1.5 L glass reactor provided with stirrer, 1.0 L of hexane at 20° C. and whilst stirring 50 g of the catalyst component prepared as described above were introduced at 10° C. Keeping constant the internal temperature, 15 g (40 cc) of tri-n-octylaluminum (TNOA) in hexane (about 370 g/l) were slowly introduced into the reactor and the temperature was kept at 10° C. After 10 minutes stirring, 20 g of propylene were carefully introduced into the reactor at the same temperature during a time of 2 hours. The consumption of propylene in the reactor was monitored and the polymerization was discontinued when a theoretical conversion of 0.4 g of polymer per g of catalyst was deemed to be reached. Then, after 30° of further stirring, 30 g of ethylene were fed into the reactor in 3 hour to complete the prepolymerisation process. Once again the monomer consumption was monitored to get a final theoretical conversion of 1.0 g of total polymers (PP and PE) per gram of starting catalyst. The product was washed four times with hexane at a temperature of 20° C. (50 g/l). Its porosity due to pores having radius until 1 μm was 0.35 $cm^3/g$. 50% of this porosity being due to pores having radius equal to, or lower than, 0.2 μm.

The so obtained pre-polymerized solid catalyst component (A) was employed in the ethylene polymerization according to both slurry and gas phase procedure the results of which are reported in table 1 and 2 respectively.

Example 2

The same catalyst prepared according to the procedure described in example 1 was used but the prepolymerisation process was carried out as follows:

into a 1.5 L glass reactor provided with stirrer, 1.0 L of hexane at 20° C. and whilst stirring 50 g of the catalyst component prepared as described above were introduced at 10° C. Keeping constant the internal temperature, 15 g (40 cc) of tri-n-octylaluminum (TNOA) in hexane (about 370 g/l) were slowly introduced into the reactor and the temperature was kept at 10° C. Then, Ciclohexylmethyldimethoxysilane was added to the slurry in order to have a Al/Si=100 mol/mol. After 10 minutes stirring, 30 g of ethylene were carefully introduced into the reactor at the same temperature during a time of 3 hours. The consumption of ethylene in the reactor was monitored and the polymerization was discontinued when a theoretical conversion of 0.6 g of polymer per g of catalyst was deemed to be reached. Then, after 30° of further stirring, 20 g of propylene were fed into the reactor in 2 hour to complete the prepolymerisation process. Once again the monomer consumption was monitored to get a final theoretical conversion of 1.0 g of polymers (PE and PP) per gram of starting catalyst. The product was washed four times with hexane at a temperature of 20° C. (50 g/l). Its porosity due to pores having radius until 1 μm was 0.23 $cm^3/g$. 71% of this porosity being due to pores having radius equal to, or lower than, 0.2 μm.

The so obtained pre-polymerized solid catalyst component (A) was employed in the ethylene polymerization according to both slurry and gas phase procedure the results of which are reported in table 1 and 2 respectively.

Example 3

The catalyst was prepared according to the procedure described in example 2 but the prepolymerisation process was carried out in absence of Ciclohexylmethyldimethoxysilane. Its porosity due to pores having radius until 1 μm was 0.30 $cm^3/g$. 70% of this porosity being due to pores having radius equal to, or lower than, 0.2 μm.

The so obtained pre-polymerized solid catalyst component (A) was employed in the ethylene polymerization according to slurry procedure the results of which are reported in table 1.

Comparative Example 4

The catalyst was prepared according to the procedure described in example 1 but the prepolymerisation process was carried out using only ethylene (50 g fed in 5 h) as monomer to get a final conversion of 1.0 g of PE per gram of catalyst. Its porosity due to pores having radius until 1 μm was 0.49 $cm^3/g$. 36% of this porosity being due to pores having radius equal to, or lower than, 0.2 μm.

The so obtained pre-polymerized solid catalyst component (A) was employed in the ethylene polymerization according to both slurry and gas phase procedure the results of which are reported in table 1 and 2 respectively.

Comparative Example 5

The catalyst was prepared according to the procedure described in example 2 but the prepolymerisation process was carried out using only propylene (50 g fed in 5 h) as monomer to get a final conversion of 1.0 g of PP per gram of catalyst. Its porosity due to pores having radius until 1 μm was 0.27 cm$^3$/g. 52% of this porosity being due to pores having radius equal to, or lower than, 0.2 μm.

The so obtained pre-polymerized solid catalyst component (A) was employed in the ethylene polymerization according to both slurry and gas phase procedure the results of which are reported in table 1 and 2 respectively.

TABLE 1

Hexane slurry polymerization tests

| Cat. Example # | Prepoly | Mil. Kg/g | MIE (g/10') | F/E | BDP (g/cc) | P50 (micron) |
|---|---|---|---|---|---|---|
| Comp. 1 | PP/PE | 23.3 | 0.43 | 29.7 | 0.239 | 2349 |
| 2 | PE/PP | 22.3 | 0.30 | 27.2 | 0.320 | 1919 |
| 3 | PE/PP | 21.6 | 0.6 | 29.3 | 0.319 | 1842 |
| Comp. 4 | PE | 7.7 | 1.1 | 36.0 | 0.326 | 1480 |
| Comp. 5 | PP | 19.4 | 0.68 | 29.5 | 0.199 | 2122 |

TABLE 2

Gas phase polymerization tests

| Cat. Example # | Prepoly | Mil. Kg/g | MIE (g/10') | BDP (g/cc) | P50 (micron) |
|---|---|---|---|---|---|
| Comp. 1 | PP/PE | 3.4 | 100 | 0.305 | 1180 |
| 2 | PE/PP | 4.5 | 110 | 0.406 | 1228 |
| Comp. 4 | PE | 2.0 | 120 | 0.404 | 960 |
| Comp. 5 | PP | 4.2 | 99 | 0.288 | 1160 |

What is claimed is:

1. A pre-polymerized catalyst component for the polymerization of olefins CH$_2$=CHR, wherein R is hydrogen or a C$_1$-C$_{12}$ hydrocarbon group, comprising a non-stereospecific solid catalyst component containing Ti, Mg and a halogen, and an ethylene/propylene block (co)polymer from 0.1-0.9 g per g of said solid catalyst component, said pre-polymerized catalyst component being characterized by a mercury porosity, due to pores having a radius up to 1 μm, from 0.15 to 0.30 cm$^3$/g and at least 55% of said porosity is due to pores having a pore radius up to 0.2 μm.

2. The pre-polymerized catalyst component according to claim 1 in which the mercury porosity of the prepolymerized catalyst component is less than 70% of the mercury porosity value of the non-stereospecific solid catalyst component precursor in non prepolymerized form.

3. The pre-polymerized catalyst component according to claim 1 in which the solid catalyst component further comprises an electron donor compound selected from esters of aliphatic or aromatic carboxylic acids, alkoxybenzenes, cyclic alkyl ethers, and electron donor compounds of the general formula (I):

$$RR_1C(OR_4)\text{—}CR_2R_3(OR_5) \qquad (I)$$

where R, R$_1$, R$_2$ and R$_3$ are, independently, hydrogen or C$_1$-C$_{20}$ hydrocarbon groups which can also be condensed to form a cycle, R$_4$ and R$_5$ are C$_1$-C$_{20}$ alkyl groups, or R$_6$CO— groups where R$_6$ is a C$_1$-C$_{20}$ alkyl or aryl group, or they can be joined with R and R$_3$ respectively to form a cycle; and R to R$_6$ groups optionally comprise at least one heteroatom selected from O, Si, halogens, S, N and P.

4. A catalyst system for the polymerization of olefins comprising the product obtained by contacting (A) the pre-polymerized catalyst component of claim 1; and (B) an Al-alkyl compound selected from triethyl aluminum, tri-n-octylaluminum, triisobutylaluminum and combinations thereof.

5. A process for the (co)polymerization of ethylene, wherein ethylene and, optionally, one or more α-olefins having from 3 to 12 carbon atoms, are contacted with a catalyst comprising (A) the pre-polymerized catalyst component of claim 1 and (B) an Al-alkyl compound.

* * * * *

UNITED STATES PATENT AND TRADEMARK OFFICE
CERTIFICATE OF CORRECTION

PATENT NO. : 9,593,178 B2
APPLICATION NO. : 14/365357
DATED : March 14, 2017
INVENTOR(S) : Diego Brita et al.

It is certified that error appears in the above-identified patent and that said Letters Patent is hereby corrected as shown below:

In the Specification

Column 2    Line 61    Delete "C1-C12" and insert --$C_1$-$C_{12}$--

Column 3    Line 30    Delete "C1-C6" and insert --$C_1$-$C_6$--

Column 4    Line 12    Delete "C1-C20" and insert --$C_1$-$C_{20}$--

Column 4    Line 17    Delete "C1-C8" and insert --$C_1$-$C_8$--

Column 4    Line 56    Delete "C1-C20" and insert --$C_1$-$C_{20}$--

Column 4    Line 61    Delete "C1-C20" and insert --$C_1$-$C_{20}$--

Column 4    Line 67    Delete "C1-C5" and insert --$C_1$-$C_5$--

Column 9    Line 20    Delete "TiCl4," and insert --$TiCl_4$,--

Column 9    Line 57    Delete "30°" and insert --30'--

Column 10   Line 23   Delete "30°" and insert --30'--

Signed and Sealed this
Fifteenth Day of October, 2019

Andrei Iancu
*Director of the United States Patent and Trademark Office*